Patented July 16, 1935

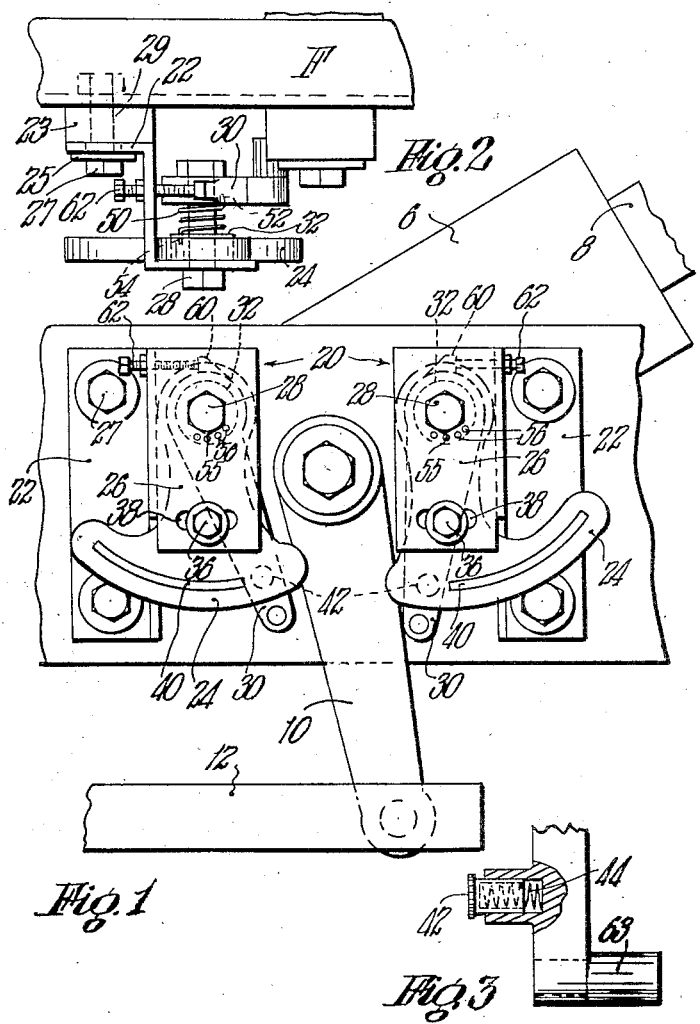

2,008,166

UNITED STATES PATENT OFFICE 2,008,166

CIRCUIT CLOSER

Elisha F. Beaverstock, Holyoke, Mass.

Application October 26, 1932, Serial No. 639,641

3 Claims. (Cl. 200—59)

This invention relates to improvements in circuit closers adapted for use in connection with direction indicating apparatus for motor vehicles and the like.

The principal objects of the invention are directed to the provision of a circuit closer device for operating direction indicating apparatus for automobiles and the like adapted to indicate right and left turns. The circuit closer may be operated automatically by movements of the steering mechanism of the vehicle independently of the operator thereof.

The novel features of the invention in the form at present preferred are disclosed more fully hereinafter and it will be understood that various changes and modifications may be made without departing from the scope of the invention. For purposes of disclosure the preferred embodiment of the invention is shown by the accompanying drawing wherein;

Fig. 1 is a side elevational view of parts of the apparatus of the invention associated with a frame of a motor vehicle.

Fig. 2 is a plan view of certain of the parts shown in Fig. 1, and

Fig. 3 is a side elevational view of the lower end of one of the signal operating levers of the invention.

The invention in its broad aspect contemplates the provision of a circuit closer for a direction indicating device at the forward or rear ends or at both ends of a motor vehicle which is operated by certain parts of the steering mechanism. The indicating device or devices may include a receptacle having lenses at the forward side thereof indicating right and left hand directions behind which are located electric light bulbs. These bulbs are included in circuits which are opened and closed accordingly as certain parts of the steering mechanism of the vehicle move in one direction or the other to operate the circuit closer. In that way the indicating device is brought into play automatically and quite independently of the operator of the vehicle.

Referring now to the drawing more in detail the invention will be fully described.

A side member or frame F of an automobile is shown and has associated therewith a casing 6 from which extends a steering column 8. A steering lever 10 is pivoted outside the frame F for swinging movements to operate a steering rod 12 and a mechanism of usual form within the casing 6 brings about swinging movements of the lever 10 accordingly as the steering column 8 is rotated in one direction or the other. According to this invention I make use of the swinging movements of the lever 10 to automatically operate the circuit closing device, although some other part of the steering mechanism may be utilized.

Brackets 20 in the form of Z's have rearmost flanges 22 which overlie insulating blocks 23 and are secured to the frame F at either side of the lever 10. Adjustable segments 24 are associated with forward flange members 26 of the brackets 20. Bolts 28 have switch levers 30 oscillatable on their inner ends.

Washers 32 are carried by the bolts 28 and the segments 24 mentioned have their upper ends oscillatable on said washers. Bolts 36 associated with the segments pass through slots 38 of the plate members 26 and are arranged so that the segments may swing in one direction or the other for adjustment. The segments may be clamped in various positions of adjustment by the bolts 36.

In the form of the invention shown the segments 24 are preferably of insulating material and carry contact segments 40 of metal. The levers 30 have contacts 42 in their lower ends which are spring pressed outwardly by means of springs 44. These are arranged so that the forward faces thereof bear on the segments 24 and may contact with the contacts 40.

Means for acting on the levers so that their lower ends are urged towards one another may consist of coil springs 50 such as shown in Fig. 3. Ends 52 of the springs 50 are engaged in openings in the levers 30 and the other ends 54 are received in suitable openings in the washers 32. Pins 55 of the washers 32 are receivable in openings 56 of the plates 26. The washers 32 may be rotated to adjust the tension of the springs 50 and are held in various positions of adjustment by the pins 55 inserted in some one of the openings 56.

Lugs 60 provided on the levers 30 are arranged to abut adjusting screws 62 in threaded engagement with the brackets 20. These screws limit the inward movement of the levers 30 and are preferably set so that when the lever 10 is in a normal position wherein the steering mechanism is positioned for straightaway driving the lower ends of the levers 30 will not be engaged by the lever 10 by slight movements thereof in the normal operation of the vehicle.

Preferably the brackets 22 are insulated from the frame F by means of insulating blocks such as 23 shown in Fig. 3 and washers 25 of insulating material are disposed beneath the heads 27 of bolts 29 which secure the brackets to the frame. Members 63 at the lower ends of levers 30 are provided which are preferably of insulating material so that the levers will not be grounded to the chassis as the lower ends of the levers are engaged by the lever 10.

From the foregoing it will be observed that as the vehicle steering mechanism is operated to turn the vehicle the levers 30 will be actuated to open and close a circuit which may include a direction indicating device.

What I claim is:

1. In a signal device, a circuit closing device adapted to be mounted upon a vehicle at opposite sides of the arm of the steering apparatus arranged to swing in opposite directions from a central position including, supporting means, segments at opposite sides of said arm having lower end portions, pivotal connections between said segments and supporting means, means to clamp said segments to the supporting means in various positions of adjustment, separate swinging levers on said pivotal connections having lower ends extending downwardly at either side of said arm arranged to traverse said segments, spring means to urge said levers inwardly towards said arm, stops limiting the innermost position of said levers so that they are spaced from said arm when in central position, means on the lower ends of said levers engageable by and in the path of movement of said arm, contacts on said levers and elongated contacts on said lower end portions of said segments, all adapted and arranged whereby as the arm swings from its central position one of said levers is swung thereby to bring the contact thereof onto and along the elongated contact of a segment, said contacts on the levers including members urged outwardly from the levers by springs.

2. In a signal device, a circuit closing device adapted to be mounted upon a vehicle at opposite sides of the arm of the steering apparatus arranged to swing in opposite directions from a central position including, supporting means, segment at opposite sides of said arm having lower end portions, pivotal connections between said segments and supporting means, means to clamp said segments to the supporting means in various positions of adjustment, separate swinging levers on said pivotal connections having lower ends extending downwardly at either side of said arm arranged to traverse said segments, spring means to urge said levers inwardly towards said arm, stops limiting the innermost position of said levers so that they are spaced from said arm when in central position, means on the lower ends of said levers engageable by and in the path of movement of said arm, contacts on said levers, and elongated contacts on said lower end portions of said segments, all adapted and arranged whereby as the arm swings from its central position one of said levers is swung thereby to bring the contact thereof onto and along the elongated contact of a segment, the said contacts on the levers including members urged outwardly from the levers by springs, said stops including adjusting screws in threaded engagement with said supporting means.

3. In a signal device, a circuit closing device adapted to be mounted upon a vehicle at opposite sides of the arm of the steering apparatus arranged to swing in opposite directions from a central position including, supporting means, segments at opposite sides of said arm having lower end portions, pivotal connections between said segments and supporting means, means to clamp said segments to the supporting means in various positions of adjustment, separate swinging levers on said pivotal connections having lower ends extending downwardly at either side of said arm arranged to traverse said segments, spring means to urge the said levers inwardly towards said arm, stops limiting the innermost position of said levers so that they are spaced from said arm when in central position, means on the lower ends of said levers engageable by and in the path of movement of said arm, contacts on said levers, and elongated contacts on said lower end portions of said segments, all adapted and arranged whereby as the arm swings from its central position one of said levers is swung thereby to bring the contact thereof onto and along the elongated contact of a segment.

ELISHA F. BEAVERSTOCK.